ed May 24, 1966

3,252,290
GROUTING OF UNDERWATER FORMATIONS
Duane W. Gagle and Dale F. Levy, both of Bartlesville, Okla., assignors to Phillips Petroleum Company, a corporation of Delaware
No Drawing. Filed Oct. 27, 1961, Ser. No. 148,034
8 Claims. (Cl. 61—36)

This invention relates to a method of decreasing water seepage through fissured and porous formations disposed beneath water bodies. In another aspect it relates to the applying of a cationic asphalt emulsion near the surface of a body of water and permitting it to settle therethrough and be drawn into the seepage channels in underwater formation. In still another aspect it relates to preconditioning the water body in the vicinity of the fissures so as to insure coalescence of the asphalt as it settles into the areas to be plugged.

It is well known to inject asphalt emulsions into loose or porous formations, such as sands and shales, either to consolidate them or impermeabilize them, or both. It is, of course, necessary that these emulsions first travel to the area to be plugged, and thereafter "break." Various combinations of the emulsion with a coagulant, or the subsequent addition of a second liquid to trigger the precipitation of the asphalt emulsion, have been described.

Cationic asphalt emulsions are ideally suited as impermeabilizing materials for water courses, irrigation canals, dikes, reservoirs, and like hydraulic structures, where water seepage into natural or man made fissures presents a problem. This is because the slightly basic pH of many of such bodies of waters, has an emulsion breaking tendency that results in a pattern of progressive coalescence of the asphalt, depending upon the natural calcium ion concentration of the water and the time of contact therewith. Similarly, other positively charged constituents, whether naturally occurring or artificially dispersed in the water body, can be used to accelerate or control the breaking of the cationic emulsions in the desired place. The elimination of piping to conduct the emulsion to the fissured portions of the underwater strata is also a desirable step for flexibility and economy.

It is, therefore, an object of this invention to provide an improved process for decreasing the permeability of fissured formations beneath the surface of water bodies.

It is another object of this invention to provide a controlled method of breaking of an asphalt emulsion and causing coalescence as it reaches seepage channels in the submerged portions of hydraulic structures.

It is another object of this invention to provide in the water body a pH condition that initiates the breaking and agglomeration of an asphalt emulsion as it settles to the underlying formation.

It is another object to avoid drilling and piping into the seepage channels in order to position the emulsion in the area to be sealed.

According to this invention, there is provided a method for decreasing the water seepage through fissures in the submerged portions of underwater natural formations or man made hydraulic structures, comprising spraying or flowing upon the surface, or injecting below the surface, of the retained water body a cationic asphalt emulsion, and permitting the natural pH when greater than 7, to gradually coalesce said emulsion as it settles and is drawn into the channels of seepage in said underlying structure, thereby substantially plugging said channels. The rates of dispersion of the prepared emulsion should preferably be in the range of 1 to 20 gallons per 100 square foot of water surface. More can be used, of course, depending on the size of the fissures or openings to be plugged. It is entirely feasible to employ up to 100 gallons per 100 square foot. The emulsion should have a specific gravity in excess of 1.0 for optimum settling conditions.

In another embodiment, the natural pH of the overlying water body has been determined as being neutral, or at least slightly acidic, and thus not capable of breaking the cationic emulsion upon contacting the same. In this situation, the water body is preconditioned by the dispersing thereover of a coagulant, such as commercial quick lime, or slaked lime (calcium hydroxide), which forms a dilute lime water in the area of dispersal, altering the pH to at least slightly basic, in the range 7.2 to 7.7, and preferably on the order of 7.5, and assuring that the emulsion will coalesce into small droplets as it settles, and is carried into the void spaces of the structure. Other water soluble alkaline materials may be used, for example, the coagulant may be selected from the group consisting of alkali earth and alkaline earth metal hydroxides. The asphalt particles will agglomerate, building a plug that forms an effective barrier to water seepage. Alternatively, the dispersion of the emulsion on the water surface can be followed up by the spraying of a dilute solution of the emulsion breaker additive, such as slaked lime.

A typical cationic asphalt emulsion suitable for use in the process of this invention comprises: 65 parts by weight of asphalt and 34.4 parts of relatively pure water. An asphalt-in-water emulsion was formed of these components by the use of an emulsifier further comprising 0.5 weight percent of the emulsion, the emulsifier being the sulfamic acid addition product of a cationic, surface-active agent, specifically tallow diamine sulfamic acid. The amount of acid used will be in a weight ratio of approximately 1:2 to the organic surfactant. Almost any other acid, such as acetic, hydrochloric, or sulfuric is suitable to form the addition product which comprises the emulsifying agent, however, sulfamic acid is preferred as it results in an asphalt with superior adhesion characteristics.

The formation of the emulsion in the colloid mill was promoted by the addition of about 0.1 weight percent calcium chloride, although a number of common metallic salts will serve almost as well as an emulsion promoter. These promoters are selected from the calcium, sodium, aluminum, magnesium and lead salts of hydrochloric, nitric and sulfuric acids. Particularly useful are sodium, ammonium and aluminum chloride, lead nitrate, and aluminum sulfate.

The asphalt employed in this invention can be any asphalt which has been determined by methods well known to those skilled in the art as being suitable for road paving. It has been found that asphalts, having a penetration at 25° C. of from 60 to 300 are suitable for forming the emulsion employed in this invention. For the penetration range described above, heating at about 250° to 300° provides a hot liquid asphalt suited to be fed to a colloid mill for the combination and emulsification therein. The particulate asphalt content of the final emulsion ranges from between 60 and 70 parts by weight. For a detailed description of a method of preparing a cationic asphalt emulsion, see our copending Serial No. 99,382, dated March 31, 1964, now U.S. Patent No. 3,093,595, issued June 11, 1963.

In grouting of underwater crevices, the prepared emulsion may be temporarily stored at the site, provided it is maintained under non-freezing conditions. The emulsion may be sprayed on the water surface from a road surrounding the area to be sealed, or dispersed from a boat where a fissured formation is remote from the land involved.

The size of the asphalt particles formed can be influenced, to some extent, by the breaking time-coagulant relationship. Heavier particles will tend to seek the void spaces in the underlying strata, and the cationic nature will permit an effective seal by mechanical intrusion into these spaces. In the case of sandy formations (predominately siliceous), the polar properties of the asphalt can work to full advantage by establishing of firm bonds to siliceous, or other negatively charged surfaces. The disclosed method will be more economical than any other known method for minimizing water seepage loss to underwater structures.

One of the applications is in the transfer of water via canals located in hot, sandy areas, such as deserts. The aforedescribed properties of the emulsion will assure a good bond to silica sands, forming a water impermeable barrier.

Various other modifications and alterations of this invention will become apparent to those skilled in the art without departing from the scope and spirit of this invention and it should be understood that the latter is not necessarily limited to the aforementioned discussion.

We claim:

1. A method for decreasing the permeability of an earth formation retaining a body of water having a pH greater than 7, said formation having channels of seepage comprising: applying near the surface of said body over an area of said earth formation to be treated a cationic asphalt emulsion having a specific gravity greater than the specific gravity of said water, and permitting the natural condition of said water to coalesce said emulsion with passage of time as it settles through said body, whereby the freed asphalt particles are drawn into the underlying channels of seepage and deposited therein, eventually plugging the same.

2. The method of claim 1 in which the rate of application of said emulsion is in the range of one to 20 gallons per 100 square feet of water surface.

3. A method for decreasing the permeability of an earth formation retaining a body of water and having channels of seepage, said water having a natural condition incapable of coalescing the particles of a cationic asphalt emulsion with the passage of time, comprising: dispersing in a selected area of said water body a coagulant which forms a dilute aqueous solution therein and changes the water condition to one capable of coalescing said emulsion, and applying near the surface of said water body over an area of said earth formation to be treated an amount of said emulsion having a specific gravity greater than the specific gravity of said body which will coalesce upon contacting said body and settle therethrough, whereby the freed asphalt particles are drawn into the underlying channels of seepage, eventually plugging the same.

4. The method of claim 3 in which the rate of dispersion of said emulsion is in the range of one to 20 gallons per 100 square feet of water surface.

5. The method of claim 3 in which said coagulant is calcium hydroxide.

6. The method of claim 3 in which said coagulant is dispersed in said water body in an amount sufficient to raise the pH to between 7.2 and 7.7.

7. A method for decreasing the permeability of an earth formation retaining a body of water and having channels of seepage, said water having a natural condition incapable of coalescing the particles of a cationic asphalt emulsion with the passage of time, comprising: spreading upon the surface of said body over an area of said earth formation to be treated a cationic asphalt emulsion having a specific gravity greater than the specific gravity of said body, dispersing in the area of said water body covered with said emulsion a coagulant which forms a dilute aqueous solution in said water body, thereby changing the water condition to that which initiates and accelerates the coalescene of said emulsion as it settles therethrough, whereby the freed asphalt particles are drawn into the underlying channels of seepage, eventually plugging the same.

8. The method of claim 7 in which said coagulant is calcium hydroxide.

References Cited by the Examiner

UNITED STATES PATENTS

| | | | |
|---|---|---|---|
| 2,075,244 | 3/1937 | Hulst | 61—36 |
| 2,190,003 | 2/1940 | Hulst | 61—36 |
| 2,210,459 | 5/1940 | Hulst | 61—36 |
| 2,378,235 | 6/1945 | Miles | 61—36 |
| 2,574,930 | 11/1951 | Mitchell | 106—277 |
| 2,706,688 | 4/1955 | Sommer | 252—311.5 |
| 2,766,132 | 10/1956 | Blair | 106—273 |
| 2,886,458 | 5/1959 | Ceintrey | 252—311.5 |
| 3,108,441 | 10/1963 | Watson | 61—36 |
| 3,124,934 | 3/1964 | Glenn | 61—36 |

FOREIGN PATENTS 702,818   1/1954   Great Britain.

OTHER REFERENCES

Asphalts and Allied Substances, by Abraham, vol. 1, pages 57–61, inclusive, published in 1945 by D. Van Nostrand Co., New York.

A Review of the Use of Chemical Sealants for Reduction of Canal Seepage Losses, United States Dept. of Interior, Bureau of Reclamation Report No. CH–102, February 9, 1960, bibliographies 11, 25 (5 sections) 126, and 143.

United States Dept. of Interior, Bureau of Reclamation Report No. CH–102, Feb. 9, 1960, pp. 2, 6, 7, 9 and 10 and bibliography 66 (4 sections).

CHARLES E. O'CONNELL, *Primary Examiner.*

JACOB L. NACKENOFF, EARL J. WITMER,
*Examiners.*